No. 705,494. Patented July 22, 1902.
F. R. WAINWRIGHT.
CHECKING MACHINE.
(Application filed Aug. 27, 1901.)
(No Model.) 5 Sheets—Sheet 1.

WITNESSES:
INVENTOR
Frank R. Wainwright
BY
ATTORNEYS

No. 705,494. Patented July 22, 1902.
F. R. WAINWRIGHT.
CHECKING MACHINE.
(Application filed Aug. 27, 1901.)

(No Model.) 5 Sheets—Sheet 2.

WITNESSES:

INVENTOR
Frank R. Wainwright
BY
ATTORNEYS

No. 705,494. Patented July 22, 1902.
F. R. WAINWRIGHT.
CHECKING MACHINE.
(Application filed Aug. 27, 1901.)
(No Model.) 5 Sheets—Sheet 3.
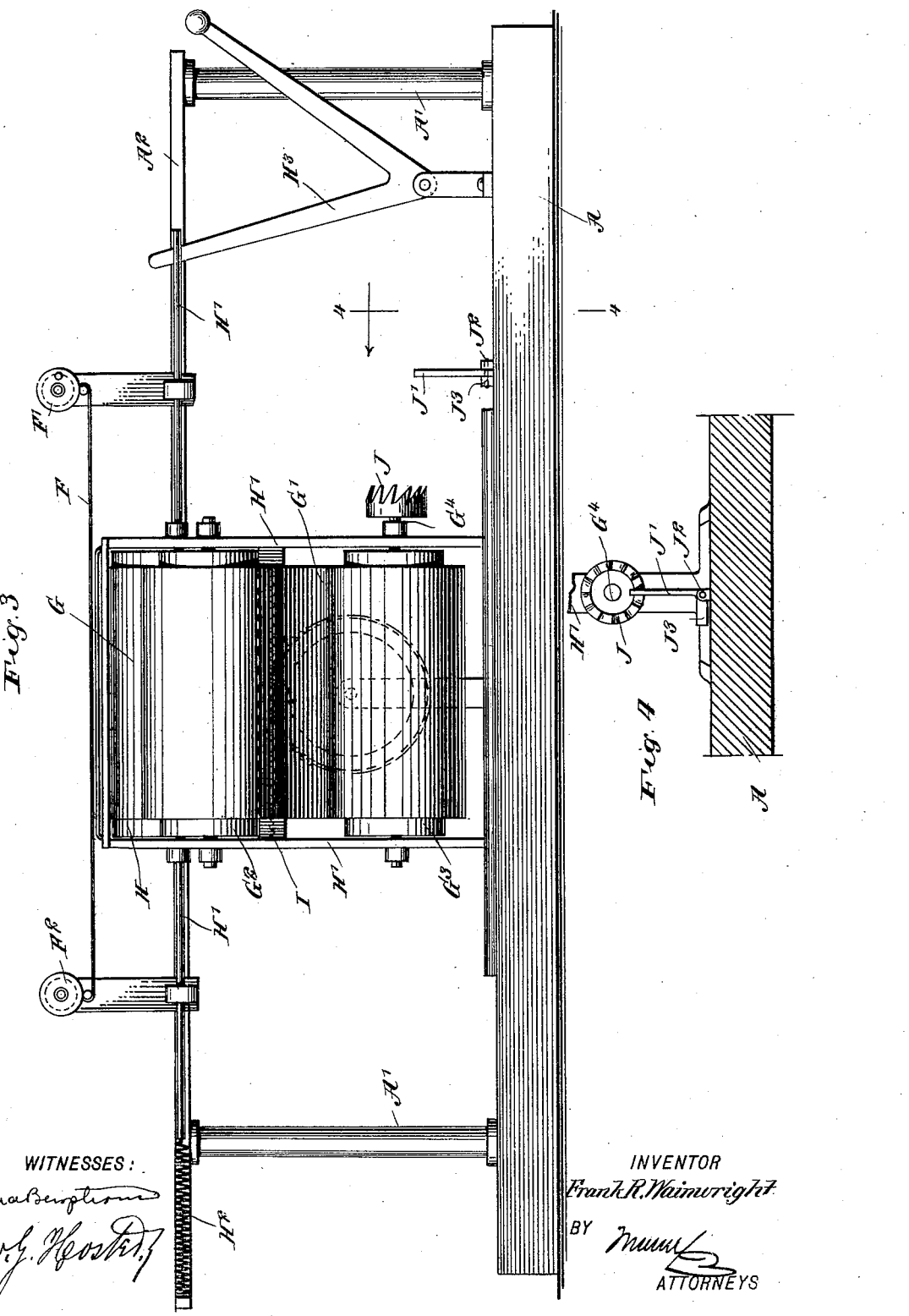
WITNESSES:
INVENTOR
Frank R. Wainwright
BY
ATTORNEYS No. 705,494. Patented July 22, 1902.
F. R. WAINWRIGHT.
CHECKING MACHINE.
(Application filed Aug. 27, 1901.)
(No Model.) 5 Sheets—Sheet 4.
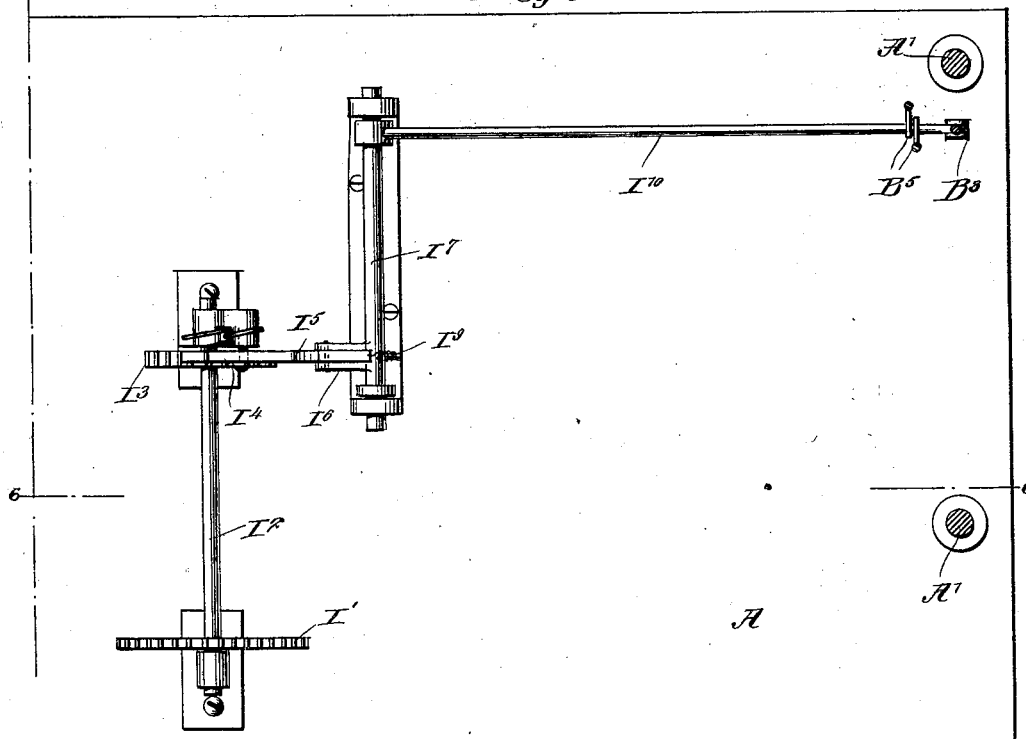
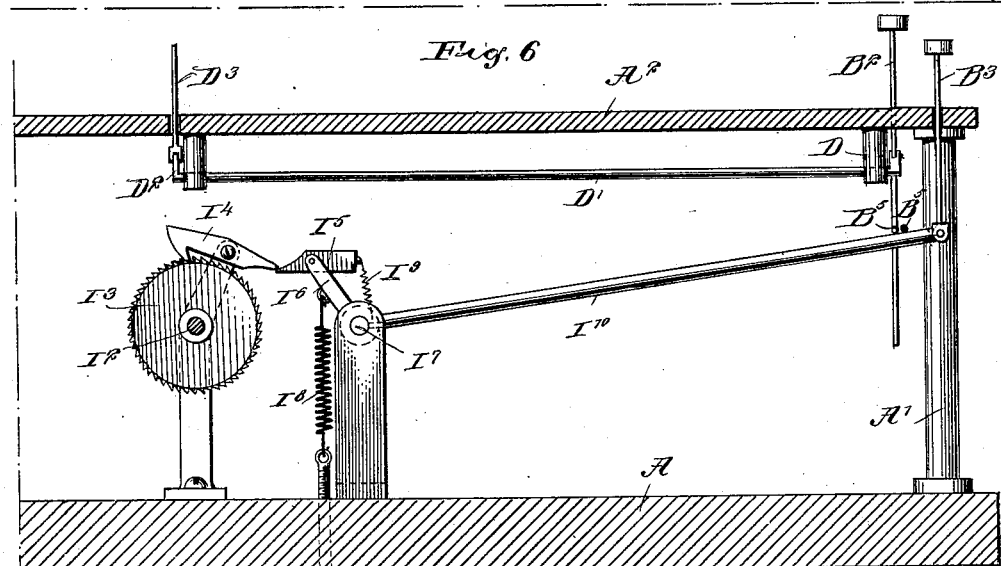
WITNESSES:
INVENTOR
Frank R. Wainwright
BY
ATTORNEYS No. 705,494.  
F. R. WAINWRIGHT.  
CHECKING MACHINE.  
(Application filed Aug. 27, 1901.)
Patented July 22, 1902.
(No Model.)
5 Sheets—Sheet 5.
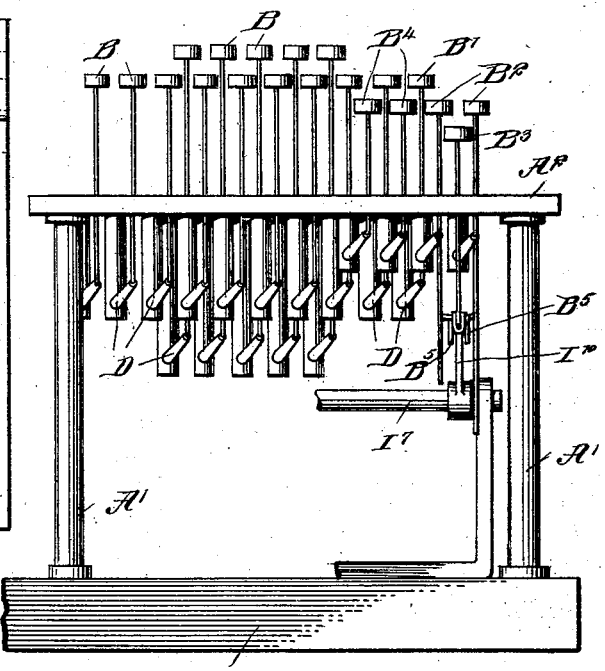
Fig. 7
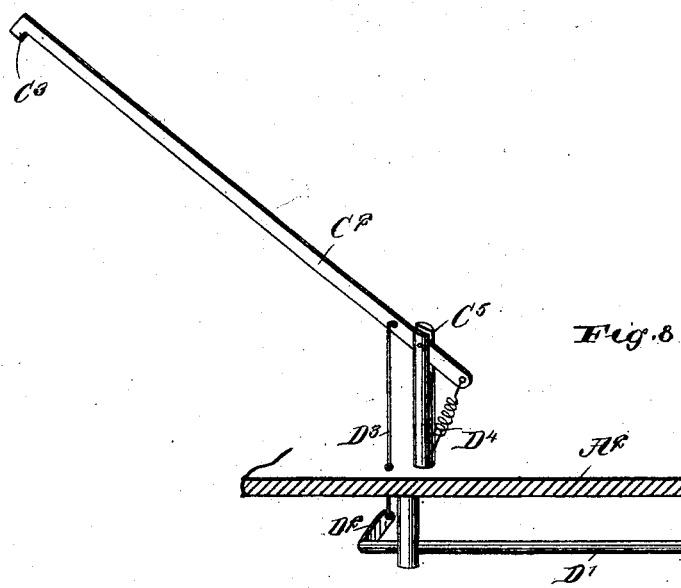
Fig. 9
Fig. 8
WITNESSES:
INVENTOR  
Frank R. Wainwright  
BY  
ATTORNEYS

UNITED STATES PATENT OFFICE.

FRANK RUSH WAINWRIGHT, OF JERSEY CITY, NEW JERSEY.

CHECKING-MACHINE.

SPECIFICATION forming part of Letters Patent No. 705,494, dated July 22, 1902.

Application filed August 27, 1901. Serial No. 73,445. (No model.)

*To all whom it may concern:*

Be it known that I, FRANK RUSH WAINWRIGHT, a citizen of the United States, and a resident of Jersey City, in the county of Hudson and State of New Jersey, have invented a new and Improved Checking-Machine, of which the following is a full, clear, and exact description.

The invention relates to type-writing machines; and its object is to provide a new and improved checking-machine more especially designed for use in hotels, restaurants, and like places, and which is simple and durable in construction, easily manipulated, not liable to get out of order, and arranged to print the number of each check, the amount of each check, the amount of each item on the check, the number of guests enumerated on the check, the number of the waiter, the amount of money collected by the waiter, and also to print a correct record of all the transactions upon a continuous duplicate slip.

The invention consists of novel features and parts and combinations of the same, as will be fully described hereinafter and then pointed out in the claims.

A practical embodiment of the invention is represented in the accompanying drawings, forming a part of this specification, in which similar characters of reference indicate corresponding parts in all the views.

Figure 1:
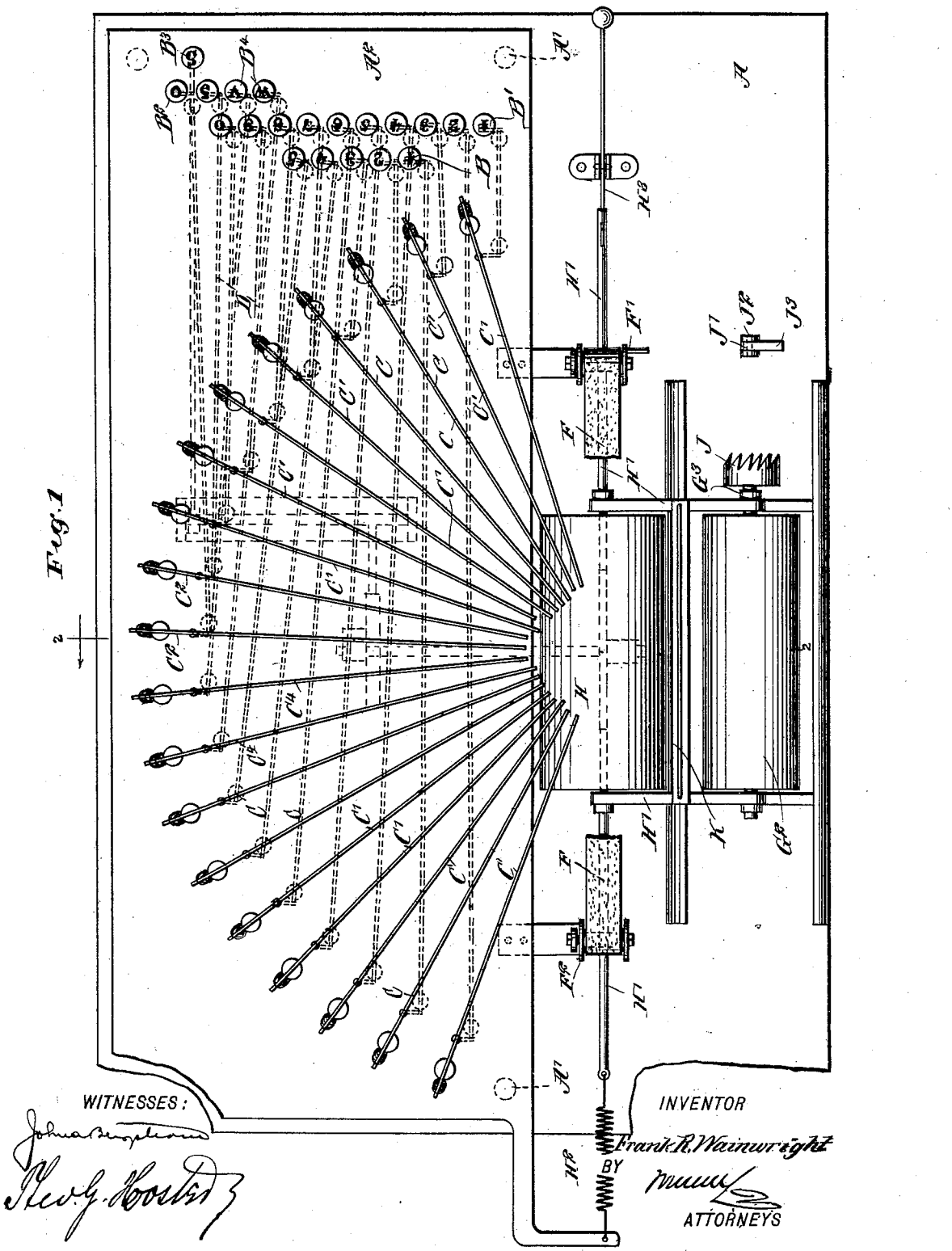
Figure 2:
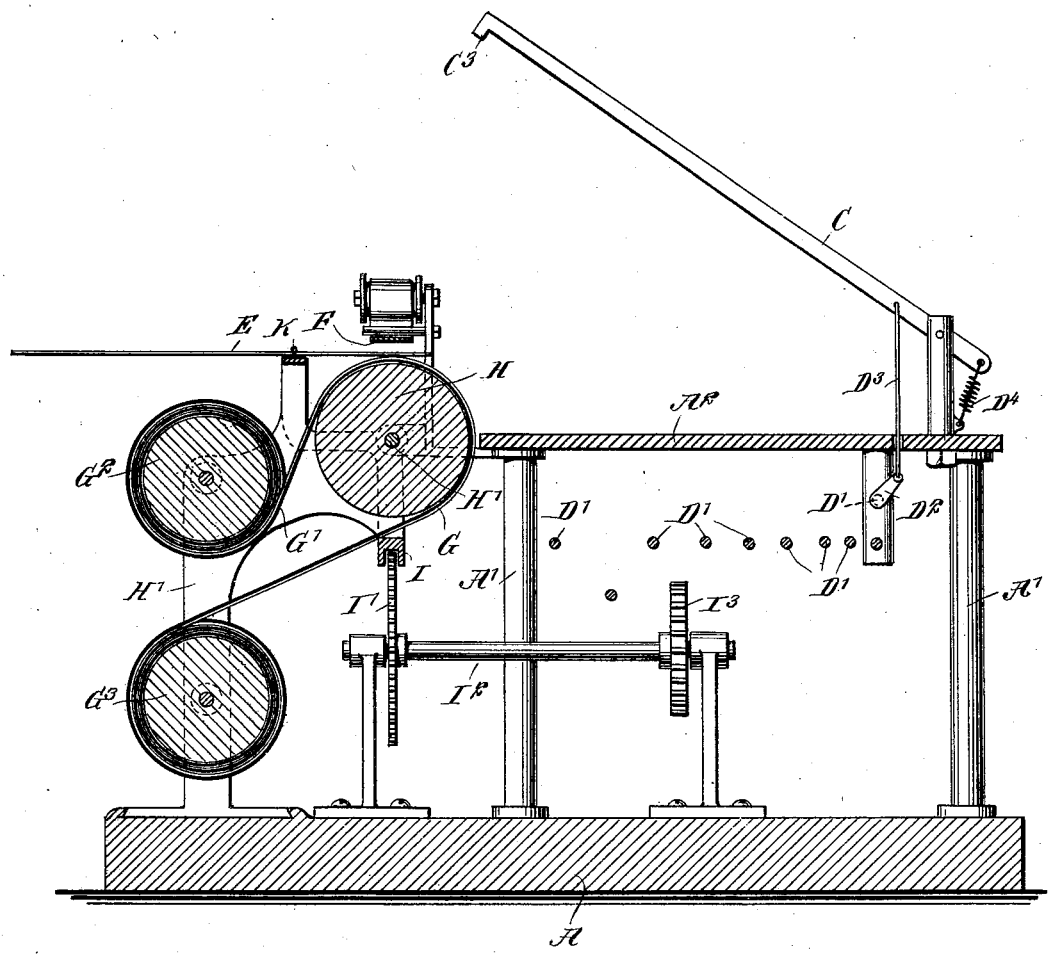

Figure 1 is a plan view of the improvement. Fig. 2 is a sectional front elevation of the same on the line 2 2 in Fig. 1. Fig. 3 is a side elevation of the improvement. Fig. 4 is a sectional elevation of the mechanism for turning the roller-platen, taken on the line 4 4 in Fig. 3. Fig. 5 is a sectional plan view of the spacing device. Fig. 6 is a sectional side elevation of the same on the line 6 6 in Fig. 5. Fig. 7 is a front elevation of the improvement. Fig. 8 is a transverse section of the same, and Fig. 9 is a face view of the ticket or check printed upon by the machine.

The frame of the checking-machine is preferably formed with a base A, carrying posts A', supporting a table $A^2$, on the front end of which are arranged sets of numeral-keys B B' $B^2$ and a spacing-key $B^3$, of which the keys B are the dollar or hundreds keys, the keys B' the tens-keys, and the keys $B^2$ the units-keys, the latter being preferably only two in number, one representing "5" and the other "0," as is plainly indicated in Fig. 1. The keys B preferably represent the numerals "1" to "5" and the keys B' the numerals from "1" to "0." (See Fig. 1.) Miscellaneous keys $B^4$ are also arranged on the table $A^2$ alongside the units-keys $B^2$. The sets of keys B, B', $B^2$, and $B^4$ are connected with the sets of type-bars C C' $C^2$ $C^4$, respectively, each type-bar having a type-numeral $C^3$ at its free end, the numeral corresponding to the numeral indicated on the corresponding key. Each of the keys B B' $B^2$ $B^4$ is connected to its respective type-bar by the following device, (see Figs. 2 and 8:) Each key is mounted to slide in the table $A^2$ and is pivotally connected at its lower end with an arm D, extending from a shaft D', journaled in suitable bearings arranged on the under side of the table $A^2$, and the rear end of said shaft D' carries an arm $D^2$, pivotally connected by a link $D^3$ with the corresponding type-bar $C^2$, fulcrumed at $C^5$ on the top of the table $A^2$, a spring $D^4$ engaging the rear end of the type-bar, so as to normally hold the latter in an uppermost position, together with the corresponding key. Now when a key is pressed a swinging motion is given to the arm D to turn the shaft D', which by the arm $D^2$ and the link $D^3$ imparts a downward swinging motion to the type-bar $C^2$ against the tension of the spring $D^4$ to cause the type-numeral at the free end of the type-bar to make an impression on the ticket or check E. (See Fig. 2.) The type-numeral of a type-bar in its downward movement strikes an ink or transfer ribbon F, extending transversely over the check or ticket E, and below said check or ticket E is arranged a continuous paper strip G, superimposed on a transfer-strip or ink-ribbon G', both strips G and G' passing over a roller-platen H and unwinding from a roll $G^2$ and winding up on a roll $G^3$, as indicated in Fig. 2. It is understood that for each key B, B', $B^2$, and $B^4$ there is a corresponding type-bar bearing the same type character as the key, the connection between a key and its corresponding type-bar being arranged as above described. Thus the type-bars C are connected with the dollar or one-hundred keys B, the type-bars C' are connected with the tens-keys B', the type-bars $C^2$ are connected with the units-keys $B^2$, and the type-bars $C^4$ are connected with the keys $B^4$, of which one represents "Void" and the other, say, "Wine" or other miscellaneous matter.

The type-bars C C' $C^2$ are arranged to print one alongside the other in a longitudinal row, the type-numeral of the bar C printing at the left of the ticket or check E, the type-bar C' printing next to it, and the type-bar $C^2$ making an impression at the right, as will be readily understood by reference to Fig. 9. Thus if the operator desires to print "$1.75" upon the check E, he first presses the key 1 of the sets of keys B, then the key 7 of the sets of keys B', and finally the key $B^2$ having the numeral "5." (See Fig. 1.) Thus without moving or shifting the check or ticket E the amount "one dollar and seventy-five cents" is printed on the ticket or check. The roller-platen H is made sufficiently large in diameter that several type-bars can readily strike successively one alongside the other without danger of blurring the check, especially as the latter yields sufficiently over the platen for the purpose.

The ribbon F extends transversely and unwinds from a roller F' and winds up on a roller $F^2$, the same as the ribbon in an ordinary type-writing machine. The rolls $G^2$ and $G^3$ and the roller-platen H are mounted to turn loosely in a carriage H', held to slide transversely in suitable bearings carried by the table $A^2$ and the base A. One end of the carriage H' is connected with a pull-spring $H^2$, and the other end is connected with a bell-crank lever $H^3$, under the control of the operator, for moving the carriage H' and the platen H to a forward position. A line-spacing device controlled by the spacing-key $B^3$ and by the units-keys $B^2$ is connected with the carriage H' to allow a transverse step-by-step sliding motion of the carriage and platen to properly space on the check or ticket E the number of guests from the number of the check and from the number of the waiter, (see top of Fig. 9,) as well as to govern the spaces between the different amounts on the check. The spacing device is constructed in the following manner: On the carriage H' is secured a rack-bar I in mesh with a gear-wheel I', secured on a longitudinally-extending shaft $I^2$, journaled in suitable bearings carried by the base A, and on said shaft $I^2$ is secured a ratchet-wheel $I^3$, (see Figs. 2, 5, and 6,) engaged by a pawl $I^4$, adapted to be actuated by a trip $I^5$ in the form of a lever fulcrumed on an arm $I^6$, extending from a shaft $I^7$, parallel to the shaft $I^2$, and likewise journaled in suitable bearings carried by the base A. A spring $I^8$ is connected with the arm $I^6$, and a similar but weaker spring $I^9$ is connected with the heel of the trip $I^5$, so that when the arm $I^6$ swings upward the trip $I^5$ can readily glide over the free end of the pawl $I^4$, and when the arm $I^6$ swings downward then the trip $I^5$, owing to the heavy spring $I^8$, imparts a swinging motion to the pawl $I^4$ to disengage the same from the corresponding tooth of the ratchet-wheel $I^3$ to allow the ratchet-wheel $I^3$, the shaft $I^2$, and the gear-wheel I' to rotate, owing to the action of the spring $H^2$ pulling the carriage H' rearwardly to move the platen H the desired distance in a transverse direction from the front to the rear of the machine. It is understood that as soon as the trip $I^5$ has passed the end of the pawl $I^4$ during the downward-swinging motion of the arm $I^6$ said pawl $I^4$ immediately falls back into position on the ratchet-wheel $I^3$ to lock the latter against further rotation, thus holding the carriage and the platen in position until the next tripping of the pawl $I^4$ takes place, as above mentioned. The shaft $I^7$ is provided with an inwardly-extending arm $I^{10}$, pivotally connected at its free end with the spacing-key $B^3$, so that when the latter is pressed the arm $I^{10}$ is caused to swing downward and turn the shaft $I^7$ to cause the arm $I^6$ to swing downward, and when the pressure on the spacing-key $B^3$ is released then the latter returns to its uppermost position, owing to the action of the spring $I^8$ on the arm $I^6$, thus causing the trip $I^5$ to actuate the pawl $I^4$, as above explained. The arm $I^{10}$ is adapted to be engaged by forks $B^5$ on the units-keys $B^2$, so that when either of the two units-keys is pressed the arm $I^{10}$ is swung downward to actuate the trip $I^5$ to release the pawl $I^4$ from the ratchet-wheel $I^3$ and allow the carriage H' and the platen H to slide rearward in a transverse direction. By having the forks $B^5$ on the units-keys $B^2$ it will be seen that the spacing-key $B^3$ may be pressed without causing action of the keys $B^2$; but when either of the keys $B^2$ is pressed the spacing device is actuated the same as when the spacing-key $B^3$ is pressed. Now it will be seen that when a units-key $B^2$ is pressed to print a units-numeral on the ticket then as soon as the operator releases the pressure on this units-key the spacing device is actuated, and consequently the platen H, with the check E thereon, is shifted transversely to allow of printing the next row of figures on the check. (See Fig. 9.)

In order to cause a traveling motion of the continuous strip G and its transfer-strip G' and to simultaneously turn the roller-platen H, the following device is provided: On the shaft $G^4$ of the roller $G^3$ is secured a toothed wheel J, adapted to move in engagement with a pawl J', pivoted at $J^2$ on the base A, and having a foot $J^3$ for holding the pawl J' normally in a vertical position. The teeth of the wheel J have inclined backs, as plainly shown in Fig. 3, so that when the wheel J moves in engagement with the pawl J' then the inclined back of a tooth travels along the pawl, and consequently the wheel J, and with it the roller $G^3$ is turned to wind up the strips G G', and thus give the same a traveling motion. Now the traveling motion thus given to the strips G G' causes the turning of the platen H and an unwinding of the said strips on the roller G², so that when the next ticket is to be printed a blank space is below the top numerals of the type-bars, and consequently the matter printed upon the check is duplicated on the strip G. Thus after a number of checks have been printed the strip G contains duplicate columns of figures, the columns being one alongside the other, giving not only the aggregate number of guests, but also the checks, the number of the waiter who serves, the single amounts for the eatables served, and the total amount of each check. Thus by adding up the total amounts, say, at the end of a day's business the total amount of money received can be readily found. The tickets or checks E are fed longitudinally through a suitable guideway K in front of the roller-platen H, as indicated in Figs. 1 and 2, so that the tickets or checks appear in proper position over the roller-platen H to allow of properly printing the amounts thereon.

The operation is as follows: The operator first actuates the lever H³ to move the platen H into a forward position and then the check or ticket E is inserted through the guideway K to bring one side of the check in a transverse direction over the platen H. The operator now presses the key or keys to indicate the number of guests—say, for instance, as shown in Fig. 9, the operator presses the key 2 of the sets of keys B', so that the numeral "2" appears opposite the "Guests No." as printed on the plain ticket. It is understood that the numeral is duplicated on the strip G. The operator now presses the spacing-key B³ to shift the carriage H' and the roller-platen H, and with them the ticket E and the strips G G', so that when the next key 3 of the sets of keys B' is pressed this numeral "3" appears on the check E opposite "Check No." and the numeral "3" is duplicated on the strip G. The spacing-key is again pressed to again shift the several parts, as previously described, after which the key 4 of the sets of keys B' and the key B², bearing "0" are successively pressed to print opposite "Waiter No." "40" on the check E and to duplicate said number "40" on the strip G. By pressing the key B², as described, automatic spacing takes place, and then the operator successively presses the two sets of keys B' and again the key B² having the "0" thereon to print "20" on the check E opposite "Bread and butter," and as the key B² is a spacing-key spacing again automatically takes place, and when the operator presses the key 1 of the sets of keys B' then the key 7 of the sets of keys B' and the key B² having the numeral "5" to print "1.75" on the check E opposite "Steak." By pressing the last-mentioned key B² spacing again takes place and the above-described operation is repeated for the several amounts, and when the several amounts have been printed then the total amount is printed on the check, as indicated, it being understood that the matter printed on the check is duplicated on the strip G.

In order to correct mistakes, the miscellaneous keys B⁴ and their type-bars C⁴ are provided. For instance, to render an amount or check void a key B⁴ is pressed the corresponding type-bar of which has its end provided with the word "Void." (See Fig. 9.) The adjacent key B⁴ is provided with the letter "W," and the corresponding type-bar C⁴ has its end provided with the word "Wine," so that a certain amount on the check can be marked "Wine" to allow of keeping a separate wine-account. When the check has been completed and removed from the machine, then the operator presses the lever H³ to again move the roller-platen H into a forward position and to cause a traveling of the strips G G' for the purpose previously described.

From the foregoing it will be seen that by the arrangement described it is possible to print the number of each check, the amount of each check, the amount of each item on the check, the number of guests served by a waiter, the number of the waiter serving the guest, and also the amount of money collected by the waiter. The strip G contains an accurate record of all the transactions—that is, it keeps an accurate record of the number of checks each waiter uses and the amount of each check, it keeps a record of the number of guests served by each waiter during a meal and the amount of money collected, it shows an accurate record of the total amount of money received during the meal and the total number of guests served, and it keeps an accurate record of the numbers of the checks, the amount of each check, the number of each waiter, the amount of each item, and the number of guests served.

It is expressly understood that I do not limit myself to the number of keys and the corresponding type in a set as described and shown; nor do I limit myself to the construction of the mechanism shown for actuating the type-bars or to the particular type-bars shown, as other impression or printing devices may be employed, the essential feature of my invention being the printing of numerals in rows on a card without actuating the line-spacing device and the platen, and the printed numerals can be seen at once by the operator, and at the same time a duplicate is formed on a continuous strip.

Having thus fully described my invention, I claim as new and desire to secure by Letters Patent—

1. A checking-machine having a roller-platen, a line-spacing mechanism, for moving the roller-platen bodily, a set of units type-bars, a set of tens type-bars, a set of hundreds type-bars, the said sets of units, tens and hundreds type-bars being arranged to print longitudinal rows of figures on the check held on the roller-platen, the said spacing mechanism remaining dormant while printing a row of figures, sets of keys for the corresponding sets of type-bars, and a connection between a key and its type-bar, as set forth.

2. A checking-machine having a roller-platen, a line-spacing mechanism for moving the roller-platen bodily, a set of units type-bars for printing units on the check held on the roller-platen and for actuating the line-spacing mechanism, a set of tens type-bars, a set of hundreds type-bars, the said sets of units, tens and hundreds type-bars being arranged to print longitudinal rows of figures on the check, sets of keys for the corresponding sets of type-bars and a connection between a key and its type-bar, as set forth.

3. A checking-machine, comprising a roller-platen mounted to slide transversely, a set of units type-bars, a set of tens type-bars and a set of hundreds type-bars, for printing longitudinal rows of figures on a check held over said platen, keys connected with said type-bars for operating the individual type-bars in said sets, and means for passing a duplicate continuous strip superimposed on a transfer-strip over said roller-platen, as set forth.

4. A checking-machine, comprising a roller-platen mounted to slide transversely, a set of units type-bars, a set of tens type-bars and a set of hundreds type-bars, for printing longitudinal rows of figures on a check held over said platen, keys connected with said type-bars for operating the individual type-bars in said sets, and means for imparting a traveling motion to a duplicate continuous strip superimposed on a transfer-strip and passing over said roller-platen, and imparting a rotary motion to the said roller-platen, as set forth.

5. A checking-machine, comprising a roller-platen mounted to slide transversely, a set of units type-bars, a set of tens type-bars and a set of hundreds type-bars, for printing longitudinal rows of figures on a check held over said platen, keys connected with said type-bars for operating the individual type-bars in said sets, and means for imparting a traveling motion to a duplicate continuous strip superimposed on a transfer-strip and passing over said roller-platen, and imparting a rotary motion to the said roller-platen, said means being actuated upon moving the roller-platen into a return position, as set forth.

6. A checking-machine, comprising a roller-platen mounted to slide transversely, a set of units type-bars, a set of tens type-bars and a set of hundreds type-bars, for printing longitudinal rows of figures on a check held over said platen, keys connected with said type-bars, for operating the individual type-bars in said sets, means for imparting a return sliding motion to the roller-platen, and means for automatically turning the roller-platen at the time it reaches a final return position, as set forth.

7. A checking-machine having a spacing mechanism for the carriage of a roller-platen, comprising a rack-bar on the carriage, a gear-wheel in mesh with the rack-bar, a ratchet-wheel on the shaft of said gear-wheel, a pawl engaging said ratchet-wheel, a spring-pressed trip for engaging said pawl, and a rock-shaft controlled by a key and pressed on by a spring, the rock-shaft having an arm on which said trip is fulcrumed, as set forth.

In testimony whereof I have signed my name to this specification in the presence of two subscribing witnesses.

FRANK RUSH WAINWRIGHT.

Witnesses:
FREDERICK A. MARVIN,
FRANK W. MARVIN.